(12) United States Patent
Ciuc

(10) Patent No.: US 8,000,526 B2
(45) Date of Patent: *Aug. 16, 2011

(54) DETECTING REDEYE DEFECTS IN DIGITAL IMAGES

(75) Inventor: Mihai Ciuc, Bucuresti (RO)

(73) Assignee: Tessera Technologies Ireland Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/824,214

(22) Filed: Jun. 27, 2010

(65) Prior Publication Data
US 2010/0260414 A1  Oct. 14, 2010

Related U.S. Application Data

(63) Continuation of application No. 11/937,377, filed on Nov. 8, 2007.

(51) Int. Cl.
*G06K 9/00* (2006.01)

(52) U.S. Cl. .................................................. 382/167

(58) Field of Classification Search .................. None
See application file for complete search history.

(56) References Cited

U.S. PATENT DOCUMENTS

| | | | |
|---|---|---|---|
| 4,285,588 A | 8/1981 | Mir | |
| 4,577,219 A | 3/1986 | Klie et al. | |
| 4,646,134 A | 2/1987 | Komatsu et al. | |
| 4,777,620 A | 10/1988 | Shimoni et al. | |
| 4,881,067 A | 11/1989 | Watanabe et al. | |
| 4,978,989 A | 12/1990 | Nakano et al. | |
| 5,016,107 A | 5/1991 | Sasson et al. | |
| 5,070,355 A | 12/1991 | Inoue et al. | |
| 5,130,789 A | 7/1992 | Dobbs et al. | |
| 5,164,831 A | 11/1992 | Kuchta et al. | |
| 5,164,833 A | 11/1992 | Aoki | |
| 5,202,720 A | 4/1993 | Fujino et al. | |
| 5,231,674 A | 7/1993 | Cleveland et al. | |
| 5,249,053 A | 9/1993 | Jain | |
| 5,274,457 A | 12/1993 | Kobayashi et al. | |
| 5,293,430 A * | 3/1994 | Shiau et al. | 382/173 |
| 5,301,026 A | 4/1994 | Lee | |

(Continued)

FOREIGN PATENT DOCUMENTS

EP  884694 A1  12/1998

(Continued)

OTHER PUBLICATIONS

"Valuation of image extrema using alternating filters by reconstruction", Vachier et al, Proceedings of the SPIE—The international Society for Optical Engineering, vol. 2568, 1995, pp. 94-103.*

(Continued)

*Primary Examiner* — Yuzhen Ge
(74) *Attorney, Agent, or Firm* — Andrew V. Smith

(57) ABSTRACT

A method for detecting a redeye defect in a digital image containing an eye comprises converting the digital image into an intensity image, and segmenting the intensity image into segments each having a local intensity maximum. Separately, the original digital image is thresholded to identify regions of relatively high intensity and a size falling within a predetermined range. Of these, a region is selected having substantially the highest average intensity, and those segments from the segmentation of the intensity image whose maxima are located in the selected region are identified.

14 Claims, 7 Drawing Sheets

U.S. PATENT DOCUMENTS

| | | | |
|---|---|---|---|
| 5,303,049 A | 4/1994 | Ejima et al. | |
| 5,335,072 A | 8/1994 | Tanaka et al. | |
| 5,384,601 A | 1/1995 | Yamashita et al. | |
| 5,400,113 A | 3/1995 | Sosa et al. | |
| 5,432,863 A * | 7/1995 | Benati et al. | 382/167 |
| 5,432,866 A | 7/1995 | Sakamoto | |
| 5,452,048 A | 9/1995 | Edgar | |
| 5,455,606 A | 10/1995 | Keeling et al. | |
| 5,537,516 A | 7/1996 | Sherman et al. | |
| 5,568,187 A | 10/1996 | Okino | |
| 5,568,194 A | 10/1996 | Abe | |
| 5,649,238 A | 7/1997 | Wakabayashi et al. | |
| 5,671,013 A | 9/1997 | Nakao | |
| 5,678,073 A | 10/1997 | Stephenson, III et al. | |
| 5,694,926 A | 12/1997 | DeVries et al. | |
| 5,708,866 A | 1/1998 | Leonard | |
| 5,719,639 A | 2/1998 | Imamura | |
| 5,719,951 A | 2/1998 | Shackleton et al. | |
| 5,724,456 A | 3/1998 | Boyack et al. | |
| 5,734,425 A | 3/1998 | Takizawa et al. | |
| 5,748,764 A * | 5/1998 | Benati et al. | 382/117 |
| 5,748,784 A | 5/1998 | Sugiyama | |
| 5,751,836 A | 5/1998 | Wildes et al. | |
| 5,761,550 A | 6/1998 | Kancigor | |
| 5,781,650 A | 7/1998 | Lobo et al. | |
| 5,805,720 A | 9/1998 | Suenaga et al. | |
| 5,805,727 A | 9/1998 | Nakano | |
| 5,805,745 A | 9/1998 | Graf | |
| 5,815,749 A | 9/1998 | Tsukahara et al. | |
| 5,818,975 A | 10/1998 | Goodwin et al. | |
| 5,847,714 A | 12/1998 | Naqvi et al. | |
| 5,850,470 A | 12/1998 | Kung et al. | |
| 5,862,217 A | 1/1999 | Steinberg et al. | |
| 5,862,218 A | 1/1999 | Steinberg | |
| 5,892,837 A | 4/1999 | Luo et al. | |
| 5,949,904 A | 9/1999 | Delp | |
| 5,974,189 A | 10/1999 | Nicponski | |
| 5,990,973 A | 11/1999 | Sakamoto | |
| 5,991,456 A | 11/1999 | Rahman et al. | |
| 5,991,549 A | 11/1999 | Tsuchida | |
| 5,991,594 A | 11/1999 | Froeber et al. | |
| 5,999,160 A | 12/1999 | Kitamura et al. | |
| 6,006,039 A | 12/1999 | Steinberg et al. | |
| 6,009,209 A | 12/1999 | Acker et al. | |
| 6,011,547 A | 1/2000 | Shiota et al. | |
| 6,016,354 A | 1/2000 | Lin et al. | |
| 6,028,611 A | 2/2000 | Anderson et al. | |
| 6,035,072 A | 3/2000 | Read | |
| 6,035,074 A | 3/2000 | Fujimoto et al. | |
| 6,036,072 A | 3/2000 | Lee | |
| 6,101,271 A | 8/2000 | Yamashita et al. | |
| 6,104,839 A | 8/2000 | Cok et al. | |
| 6,118,485 A | 9/2000 | Hinoue et al. | |
| 6,134,339 A | 10/2000 | Luo | |
| 6,151,403 A | 11/2000 | Luo | |
| 6,172,706 B1 | 1/2001 | Tatsumi | |
| 6,192,149 B1 | 2/2001 | Eschbach et al. | |
| 6,195,127 B1 | 2/2001 | Sugimoto | |
| 6,201,571 B1 | 3/2001 | Ota | |
| 6,204,858 B1 | 3/2001 | Gupta | |
| 6,233,364 B1 | 5/2001 | Krainiouk et al. | |
| 6,249,315 B1 | 6/2001 | Holm | |
| 6,252,976 B1 | 6/2001 | Schildkraut et al. | |
| 6,266,054 B1 | 7/2001 | Lawton et al. | |
| 6,268,939 B1 | 7/2001 | Klassen et al. | |
| 6,275,614 B1 | 8/2001 | Krishnamurthy et al. | |
| 6,278,491 B1 | 8/2001 | Wang et al. | |
| 6,285,410 B1 | 9/2001 | Marni | |
| 6,292,574 B1 | 9/2001 | Schildkraut et al. | |
| 6,295,378 B1 | 9/2001 | Kitakado et al. | |
| 6,298,166 B1 | 10/2001 | Ratnakar et al. | |
| 6,300,935 B1 | 10/2001 | Sobel et al. | |
| 6,381,345 B1 | 4/2002 | Swain | |
| 6,393,148 B1 | 5/2002 | Bhaskar | |
| 6,396,963 B2 | 5/2002 | Shaffer et al. | |
| 6,407,777 B1 | 6/2002 | DeLuca | |
| 6,421,468 B1 | 7/2002 | Ratnakar et al. | |
| 6,426,775 B1 | 7/2002 | Kurokawa | |
| 6,429,924 B1 | 8/2002 | Milch | |
| 6,433,818 B1 | 8/2002 | Steinberg et al. | |
| 6,438,264 B1 | 8/2002 | Gallagher et al. | |
| 6,441,854 B2 | 8/2002 | Fellegara et al. | |
| 6,459,436 B1 | 10/2002 | Kumada et al. | |
| 6,473,199 B1 | 10/2002 | Gilman et al. | |
| 6,496,655 B1 | 12/2002 | Malloy | |
| 6,501,911 B1 | 12/2002 | Malloy | |
| 6,505,003 B1 | 1/2003 | Malloy | |
| 6,510,520 B1 | 1/2003 | Steinberg | |
| 6,516,154 B1 | 2/2003 | Parulski et al. | |
| 6,614,471 B1 | 9/2003 | Ott | |
| 6,614,995 B2 | 9/2003 | Tseng | |
| 6,621,867 B1 | 9/2003 | Sazzad et al. | |
| 6,628,833 B1 | 9/2003 | Horie | |
| 6,700,614 B1 | 3/2004 | Hata | |
| 6,707,950 B1 | 3/2004 | Burns et al. | |
| 6,714,665 B1 | 3/2004 | Hanna et al. | |
| 6,718,051 B1 | 4/2004 | Eschbach | |
| 6,724,941 B1 | 4/2004 | Aoyama | |
| 6,728,401 B1 | 4/2004 | Hardeberg | |
| 6,765,686 B2 | 7/2004 | Maruoka | |
| 6,786,655 B2 | 9/2004 | Cook et al. | |
| 6,792,161 B1 | 9/2004 | Imaizumi et al. | |
| 6,798,913 B2 | 9/2004 | Toriyama | |
| 6,859,565 B2 | 2/2005 | Baron | |
| 6,873,743 B2 * | 3/2005 | Steinberg | 382/275 |
| 6,885,766 B2 | 4/2005 | Held et al. | |
| 6,895,112 B2 | 5/2005 | Chen et al. | |
| 6,900,882 B2 | 5/2005 | Iida | |
| 6,912,298 B1 | 6/2005 | Wilensky | |
| 6,937,997 B1 | 8/2005 | Parulski | |
| 6,967,680 B1 | 11/2005 | Kagle et al. | |
| 6,980,691 B2 | 12/2005 | Nesterov et al. | |
| 6,984,039 B2 | 1/2006 | Agostinelli | |
| 7,024,051 B2 | 4/2006 | Miller et al. | |
| 7,027,643 B2 * | 4/2006 | Comaniciu et al. | 382/162 |
| 7,027,662 B2 | 4/2006 | Baron | |
| 7,030,927 B2 | 4/2006 | Sasaki | |
| 7,035,461 B2 | 4/2006 | Luo et al. | |
| 7,035,462 B2 | 4/2006 | White et al. | |
| 7,042,501 B1 | 5/2006 | Matama | |
| 7,042,505 B1 | 5/2006 | DeLuca | |
| 7,062,086 B2 | 6/2006 | Chen et al. | |
| 7,116,820 B2 | 10/2006 | Luo et al. | |
| 7,133,070 B2 | 11/2006 | Wheeler et al. | |
| 7,155,058 B2 | 12/2006 | Gaubatz et al. | |
| 7,171,044 B2 | 1/2007 | Chen et al. | |
| 7,216,289 B2 | 5/2007 | Kagle et al. | |
| 7,224,850 B2 | 5/2007 | Zhang et al. | |
| 7,260,259 B2 * | 8/2007 | Comaniciu et al. | 382/173 |
| 7,269,292 B2 | 9/2007 | Steinberg | |
| 7,289,664 B2 | 10/2007 | Enomoto | |
| 7,295,233 B2 | 11/2007 | Steinberg et al. | |
| 7,310,443 B1 | 12/2007 | Kris et al. | |
| 7,315,631 B1 | 1/2008 | Corcoran et al. | |
| 7,336,821 B2 | 2/2008 | Ciuc et al. | |
| 7,352,394 B1 | 4/2008 | DeLuca et al. | |
| 7,362,368 B2 | 4/2008 | Steinberg et al. | |
| 7,369,712 B2 | 5/2008 | Steinberg et al. | |
| 7,403,643 B2 | 7/2008 | Ianculescu et al. | |
| 7,436,998 B2 | 10/2008 | Steinberg et al. | |
| 7,454,040 B2 | 11/2008 | Luo et al. | |
| 7,515,740 B2 | 4/2009 | Corcoran et al. | |
| 7,574,069 B2 * | 8/2009 | Setlur et al. | 382/276 |
| 7,574,304 B2 * | 8/2009 | Jackway et al. | 702/19 |
| 7,593,603 B1 * | 9/2009 | Wilensky | 382/311 |
| 7,606,417 B2 | 10/2009 | Steinberg et al. | |
| 7,657,060 B2 * | 2/2010 | Cohen et al. | 382/103 |
| 7,702,149 B2 * | 4/2010 | Ohkubo et al. | 382/167 |
| 7,724,950 B2 * | 5/2010 | Umeda | 382/167 |
| 7,747,071 B2 * | 6/2010 | Yen et al. | 382/165 |
| 7,796,815 B2 * | 9/2010 | Muschler et al. | 382/173 |
| 2001/0015760 A1 | 8/2001 | Fellegara et al. | |
| 2001/0031142 A1 | 10/2001 | Whiteside | |
| 2001/0052937 A1 | 12/2001 | Suzuki | |
| 2002/0019859 A1 | 2/2002 | Watanabe | |
| 2002/0044329 A1 | 4/2002 | Steinberg | |
| 2002/0051571 A1 | 5/2002 | Jackway et al. | |

| Publication No. | Date | Inventor |
|---|---|---|
| 2002/0054224 A1 | 5/2002 | Wasula et al. |
| 2002/0085088 A1 | 7/2002 | Eubanks |
| 2002/0089514 A1* | 7/2002 | Kitahara et al. ............ 345/600 |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0105662 A1 | 8/2002 | Patton et al. |
| 2002/0114513 A1 | 8/2002 | Hirao |
| 2002/0126893 A1 | 9/2002 | Held et al. |
| 2002/0131770 A1 | 9/2002 | Meier et al. |
| 2002/0136450 A1 | 9/2002 | Chen et al. |
| 2002/0141661 A1 | 10/2002 | Steinberg |
| 2002/0150292 A1 | 10/2002 | O'Callaghan |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0012430 A1* | 1/2003 | Risson ............ 382/165 |
| 2003/0021478 A1 | 1/2003 | Yoshida |
| 2003/0025808 A1 | 2/2003 | Parulski et al. |
| 2003/0025811 A1 | 2/2003 | Keelan et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0095197 A1 | 5/2003 | Wheeler et al. |
| 2003/0107649 A1 | 6/2003 | Flickner et al. |
| 2003/0113035 A1 | 6/2003 | Cahill et al. |
| 2003/0118216 A1 | 6/2003 | Goldberg |
| 2003/0137597 A1 | 7/2003 | Sakamoto et al. |
| 2003/0142285 A1 | 7/2003 | Enomoto |
| 2003/0161506 A1 | 8/2003 | Velazquez et al. |
| 2003/0190072 A1 | 10/2003 | Adkins et al. |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0041924 A1 | 3/2004 | White et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0114796 A1 | 6/2004 | Kaku |
| 2004/0114797 A1 | 6/2004 | Meckes |
| 2004/0114829 A1* | 6/2004 | LeFeuvre et al. ............ 382/275 |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0046730 A1 | 3/2005 | Li |
| 2005/0047655 A1* | 3/2005 | Luo et al. ............ 382/167 |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0069208 A1* | 3/2005 | Morisada ............ 382/190 |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1* | 10/2005 | Yoshida ............ 382/167 |
| 2005/0243348 A1 | 11/2005 | Yonaha |
| 2005/0259855 A1* | 11/2005 | Dehmeshki ............ 382/131 |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0066628 A1 | 3/2006 | Brodie et al. |
| 2006/0082847 A1 | 4/2006 | Sugimoto |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0119832 A1 | 6/2006 | Iida |
| 2006/0120599 A1 | 6/2006 | Steinberg et al. |
| 2006/0140455 A1 | 6/2006 | Costache et al. |
| 2006/0150089 A1 | 7/2006 | Jensen et al. |
| 2006/0203108 A1 | 9/2006 | Steinberg et al. |
| 2006/0204052 A1 | 9/2006 | Yokouchi |
| 2006/0204110 A1 | 9/2006 | Steinberg et al. |
| 2006/0221408 A1 | 10/2006 | Fukuda |
| 2006/0280361 A1* | 12/2006 | Umeda ............ 382/167 |
| 2006/0285754 A1 | 12/2006 | Steinberg et al. |
| 2007/0081726 A1* | 4/2007 | Westerman et al. ............ 382/185 |
| 2007/0098260 A1* | 5/2007 | Yen et al. ............ 382/167 |
| 2007/0110305 A1 | 5/2007 | Corcoran et al. |
| 2007/0116379 A1 | 5/2007 | Corcoran et al. |
| 2007/0116380 A1 | 5/2007 | Ciuc et al. |
| 2007/0133863 A1 | 6/2007 | Sakai et al. |
| 2007/0154189 A1 | 7/2007 | Harradine et al. |
| 2007/0201724 A1 | 8/2007 | Steinberg et al. |
| 2007/0263104 A1 | 11/2007 | DeLuca et al. |
| 2007/0263928 A1 | 11/2007 | Akahori |

| | | | |
|---|---|---|---|
| 2008/0002060 | A1 | 1/2008 | DeLuca et al. |
| 2008/0013798 | A1 | 1/2008 | Ionita et al. |
| 2008/0043121 | A1 | 2/2008 | Prilutsky et al. |
| 2008/0112599 | A1 | 5/2008 | Nanu et al. |
| 2008/0144965 | A1 | 6/2008 | Steinberg et al. |
| 2008/0186389 | A1 | 8/2008 | DeLuca et al. |
| 2008/0211937 | A1 | 9/2008 | Steinberg et al. |
| 2008/0232711 | A1 | 9/2008 | Prilutsky et al. |
| 2008/0240555 | A1 | 10/2008 | Nanu et al. |

FOREIGN PATENT DOCUMENTS

| | | |
|---|---|---|
| EP | 911759 A2 | 4/1999 |
| EP | 911759 A3 | 6/2000 |
| EP | 1199672 A2 | 4/2002 |
| EP | 1229486 A1 | 8/2002 |
| EP | 1296510 A2 | 3/2003 |
| EP | 1429290 A2 | 6/2004 |
| EP | 1478169 A2 | 11/2004 |
| EP | 1528509 A2 | 5/2005 |
| EP | 979487 B1 | 3/2006 |
| EP | 1429290 B1 | 7/2008 |
| GB | 841609 A | 7/1960 |
| GB | 2 379 819 A | 3/2003 |
| JP | 4192681 A2 | 7/1992 |
| JP | 5224271 A2 | 9/1993 |
| JP | 7281285 A2 | 10/1995 |
| JP | 9214839 A2 | 8/1997 |
| JP | 20134486 A2 | 5/2000 |
| JP | 22247596 A2 | 8/2002 |
| JP | 22271808 A2 | 9/2002 |
| JP | 2003-030647 A2 | 1/2003 |
| WO | WO 98/02844 A1 | 1/1998 |
| WO | WO 99/17254 A1 | 4/1999 |
| WO | WO 99/33684 A2 | 7/1999 |
| WO | WO 01/71421 A1 | 9/2001 |
| WO | WO 01/92614 A1 | 12/2001 |
| WO | WO 02/45003 A1 | 6/2002 |
| WO | WO 03/026278 A1 | 3/2003 |
| WO | WO 03/071484 A1 | 8/2003 |
| WO | WO 2004/034696 A1 | 4/2004 |
| WO | WO 2005/015896 A1 | 2/2005 |
| WO | WO 2005/041558 A1 | 5/2005 |
| WO | WO 2005/076217 A2 | 8/2005 |
| WO | WO 2005/076217 A3 | 8/2005 |
| WO | WO 2005/109853 A1 | 11/2005 |
| WO | WO 2006/011635 A1 | 2/2006 |
| WO | WO 2006/018056 A1 | 2/2006 |
| WO | WO 2006/045441 A1 | 5/2006 |
| WO | WO 2007/057063 A1 | 5/2007 |
| WO | WO 2007/057064 A1 | 5/2007 |
| WO | WO 2007/093199 A2 | 8/2007 |
| WO | WO 2007/093199 A3 | 8/2007 |
| WO | WO 2007/095553 A2 | 8/2007 |
| WO | WO 2007/095553 A3 | 8/2007 |
| WO | WO 2007/142621 A1 | 12/2007 |
| WO | WO 2008/023280 A2 | 2/2008 |
| WO | WO 2008/109644 A2 | 9/2008 |
| WO | WO 2008/109644 A3 | 9/2008 |
| WO | WO 2009/059669 A1 | 5/2009 |
| WO | WO2010/017953 A1 | 2/2010 |
| WO | WO2010/025908 A1 | 3/2010 |

OTHER PUBLICATIONS

Combier, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", Proceedings of SPIE—The International Society for Optical Engineering, Society of Photo-Optical Instrumentation, 1995, pp. 301-312.

Corcoran, P. et al., "Automated In-Camera Detection of Flash-Eye Defects", IEEE Transactions on Consumer Electronics, 2005, pp. 11-17, vol. 51—Issue 1.

Cucchiara, R. et al., "Detection of Luminosity Profiles of Elongated Shapes", International Conference on Image Processing, 1996, pp. 635-638, vol. 3.

EPO Communication pursuant to Article 94(3) EPC, for European Patent Application No. 05 792 584.4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Examination Report for European patent application No. 05792584.4, dated May 13, 2008, 8 pgs.

Gaubatz, Matthew et al., "Automatic Red-Eye Detection and Correction", IEEE ICIP, Proceedings 2002 Intl Conference on Image Processing, 2002, pp. 1-804-1-807, vol. 2—Issue 3.

Han, T. et al., "Detection and Correction of abnormal Pixels in Hyperion Images", IEEE International Symposium on Geoscience and Remote Sensing, 2002, pp. 1327-1330, vol. 3.

Iivarinen, J. et al., "Content-Based Retrieval of Defect Images, http://www.cs.tut.fi/about.avisa/digger/Publications/acivs02.pdr", Proceedings of Advanced Concepts for Intelligent Vision, Laboratory of Computer Information Science, 2002.

Ioffe, S., "Red eye detection with machine learning", Proceedings 2003 International Conference on Image Processing, 2003, pp. 871-874, vol. 2—Issue 3.

Ito, M., "An Automated System for LSI Fine Pattern Inspection Based on Comparison of Sem Images and Cad Data", IEEE International Conference on Robotics and Automation, 1995, pp. 544-549, vol. 1.

Jin, B. et al., "Modeling and Analysis of Soft-Test/Repair for CCD-Based Digital X-Ray Systems", Instrumentation and Measurement, IEEE Trans, 2003, pp. 1713-1721, vol. 52—Issue 6.

Nguyen, Karlene et al., "Differences in the Infrared Bright Pupil Response of Human Eyes", Proceedings of the 2002 symposium on Eye tracking research and applications, 2002, pp. 133-138.

Patent Abstracts of Japan, publication No. 2000050062, Image Input Device, application No. 10-217124, published Feb. 18, 2000, 1 page.

PCT International Preliminary Report on Patentability (IPRP) for PCT Application PCT/EP2005/011010, dated Jan. 23, 2007, 18 pages.

PCT International Preliminary Report on Patentability for PCT Application No. PCT/EP2005/005907, dated Nov. 15, 2006, 8 pages.

PCT International Preliminary Report on Patentability for PCT Application PCT/EP2004/008706, dated Feb. 6, 2006, 7 pages.

PCT International Preliminary Report on Patentability for PCT Application PCT/EP2004/010199, dated Apr. 3, 2006, 7 pages.

PCT International Search Report and the Written Opinion of the International Searching Authority, or the Declaration, for PCT Application No. PCT/US2008/055864, dated Jul. 30, 2008, 8 pages.

PCT International Search Report and Written Opinion of the International Searching Authority for PCT Application No. PCT/EP2004/008706, dated Nov. 19, 2004, 13 pages.

PCT International Search Report and Written Opinion of the International Searching Authority for PCT Application No. PCT/EP2005/005033.

PCT Notification Concerning Transmittal of International Preliminary Report on Patentability, for PCT Application No. PCT/US2007/062090, dated Aug. 28, 2008, 6 pages.

PCT Notification of Transmittal of the International Search Report and the Written Opinion of the Intl Searching Authority, or the Declaration (PCT/EP2006/008342), Dec. 28, 2006.

PCT Notification of Transmittal of the International Search Report and the Written Opinion of the Intl Searching Authority, or the Declaration for PCT Application No. PCT/US07/62090 issued Mar. 10, 2008, 10 pages.

PCT Notification of Transmittal of the International Search Report and the Written Opinion of the Intl Searching Authority, or the Declaration for PCT/EP/2005/011010, Jan. 23, 2006, 14 pages.

PCT Notification of Transmittal of the International Search Report and the Written Opinion of the Intl Searching Authority, or the Declaration for PCT/EP/2005/05907, Aug. 1, 2005, 12 pages.

PCT Notification of Transmittal of the International Search Report and the Written Opinion of the International Searching Authority, or the Declaration, for PCT Application No. PCT/EP2006/008358, Dec. 5, 2006, 14 pages.

PCT Notification of Transmittal of the International Search Report and the Written Opinion of the Intl Searching Authority, or the Declaration, for PCT Application No. PCT/US2008/055964, Jul. 30, 2008, 8 Pages.
PCT Notification of Transmittal of the International Search Report and the Written Opinion of the Intl Searching Authority, or the Declaration, for PCT/EP2004/010199, Dec. 13, 2004, 13 pages.
PCT Notification of Transmittal of the International Search Report and Written Opinion of the Intl Searching Authority for PCT Application No. PCT/EP2005/001171, (11 pages).
Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.
Plotnikov, Yuri et al., Winfree, "Visualization of Subsurface Defects in Composites Using a Focal Plane Array Infrared Camera , http://citeseer.ist.psu.edu/357066.html", NASA Langley Research Center, 1999.
Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.
Shen, Jianhong, "Inpainting and the Fundamental Problem of Image Processing", 2002, 6 pages.
Smolka, B. et al., "Towards Automatic Redeye Effect Removal, XP004416063", Pattern Recognition Letters, 2003, pp. 1767-1785, vol. 24—Issue 11, North-Holland Publ.
Soriano, M. et al., "Making Saturated Facial Images Useful Again, XP002325961, ISSN: 0277-786X", Proceedings of the SPIE, 1999, pp. 113-121, vol. 3826.
Tan, Yap-Peng et al., Robust Sequential Approach for the Detection of Defective Pixels in an Image Sensor, IEEE International Conference on Acoustics, Speech, and Signal Processing, 1999, pp. 2239-2242, vol. 4.
Toet, A., Multiscale Color Image Enhancement, Posted online: 200208-06 18:09:24.0 International Conference on Image Processing and its Applications, 1992, pp. 583-585.
United Kingdom Search Report dated May 22, 2007, issued in Application No. GB 0701957.3.
Willamowski, J. et al., "Probabilistic Automatic Red Eye Detection and Correction", The 18th International Conference on Pattern Recognition (ICPR'06), 2006, pp. 762-765, vol. 3, IEEE Computer Society.
Non-Final Office Action mailed Aug. 30, 2010, for U.S. Appl. No. 11/841,855, filed Aug. 20, 2007.
Non-Final Office Action mailed Aug. 5, 2010, for U.S. Appl. No. 11/462,035, filed Aug. 2, 2006.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
PCT International Preliminary Report on Patentability for PCT Application No. PCT/EP2008/008437, report issued May 11, 2010, 5 pages.
PCT Written Opinion of the International Searching Authority for PCT Application No. PCT/EP2008/008437, dated May 8, 2010, 4 pages.
Agrawal A. et al., Removing photography artifacts using gradient projection and flash-exposure sampling, CM Transactions on Graphics , 2005, pp. 828-835.
Final Office Action mailed Apr. 26, 2010, for U.S. Appl. No. 10/773,092, filed Feb. 4, 2004.
Final Office Action mailed Apr. 26, 2010, for U.S. Appl. No. 11/690,834, filed Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.
Final Office Action mailed Mar. 24, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Final Office Action mailed Sep. 1, 2009, for U.S. Appl. No. 11/841,855, filed Aug. 20, 2007.
Non-Final Office Action mailed Aug. 30, 2010, for U.S. Appl. No. 11/841,855, filed Aug. 20, 2007.
Non-Final Office Action mailed Aug. 31, 2009, for U.S. Appl. No. 11/462,035, filed Aug. 2, 2006.
Non-Final Office Action mailed Aug. 5, 2010, for U.S. Appl. No. 11/462,035, filed Aug. 2, 2006.
Non-Final Office Action mailed Jul. 14, 2009, for U.S. Appl. No. 12/192,897, filed Aug. 15, 2008.
Non-Final Office Action mailed May 3, 2010, for U.S. Appl. No. 12/187,763, filed Aug. 7, 2008.
Non-Final Office Action mailed May 4, 2010, for U.S. Appl. No. 12/192,335, filed Aug. 15, 2008.
Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Nov. 18, 2009, for U.S. Appl. No. 11/282,954, filed Nov. 18, 2005.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 24, 2009, 10 pages.
PCT Partial International Search Report for Application No. PCT/EP2009/051081, dated Apr. 29, 2009, 7 pages.
Tatsutoshi Kitajima (JP04-192681 English Translation; Electronic Camera, Jul. 10, 1992).
Translation of Hiroshi et al. JP05-224271, Mar. 1993, Japan Publication.
PCT International Preliminary Report on Patentability for PCT Application No. PCT/EP2008/008437, report issued May 11, 2010, 5 pages.
PCT Written Opinion of the International Searching Authority for PCT Application No. PCT/EP2008/008437, dated May 8, 2010, 4 pages.

* cited by examiner (a)

(c)

(b)

(a)

(b)

DETECTING REDEYE DEFECTS IN DIGITAL IMAGES

PRIORITY

This application is a Continuation of U.S. patent application Ser. No. 11/937,377, filed on Nov. 8, 2007, and this application is related to PCT application no. PCT/EP2008/008437, filed Oct. 7, 2008.

FIELD

Embodiments of the invention relate generally to the field of digital image processing and more specifically to methods and apparatuses for detecting redeye defects in digital images, such "redeye" defects including any flash-induced artifact in an image of a human or animal eye, whether actually red or not.

BACKGROUND

Redeye is a phenomenon in flash photography where a flash is reflected within a subject's eye and appears in a photograph as a light, usually red, dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The redeye phenomenon can be reduced by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically losing any spontaneity of the subject captured in the photograph.

Digital photography eliminates the need for film as the image is digitally captured and stored in a memory array for display on a display screen on the camera itself. This allows photographs to be viewed and enjoyed virtually instantaneously as opposed to waiting for film processing. Digital photography equipment includes microprocessors for image processing and compression and camera systems control. It is possible to exploit the computation capabilities of such microprocessors for performing operations to improve redeye detection and elimination.

Existing techniques for redeye detection and correction in digital images are described in U.S. Pat. No. 6,407,777 and US Patent Application Publication No. 2005/0232490. However, these prior methods are not efficient in practice.

SUMMARY

In accordance with one embodiment of the invention, a method for detecting a redeye defect in a digital image containing an eye is disclosed; the digital image is converted into an intensity image, at least a portion of the intensity image is segmented into segments each having a local intensity maximum, a corresponding portion of the digital image is thresholded to identify regions of relatively high intensity, a region from at least some of the regions of step (c) having substantially the highest average intensity is selected, and segments from step (b) intersecting the region selected at step (d) according to a pre-determined criterion are selected.

Other features and advantages of embodiments of the invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

An image acquired with a flash may include red-eye defects. In general, these red-eye defects are detected by applying a conventional eye defect detector to the image. However images acquired with a high ISO rating, for example, greater than ISO 800, may include numerous small clusters of red-pixels indicative of noise and in such cases, the eye defect detector can identify the noise speckles as relatively small red eye defects.

Embodiments of the invention provide methods and apparatuses for detecting red eyes in high ISO flash images. For one embodiment of the invention, a digital image is acquired. One or more relatively large candidate red eye defect regions are detected in at least a portion of the image. Face detection is applied to at least a portion of the image to eliminate non-face regions and one or more relatively small candidate red eye defect regions are identified in at least a portion of the image not including the eliminated non-face regions.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which image processing is effected.

Figure 1:
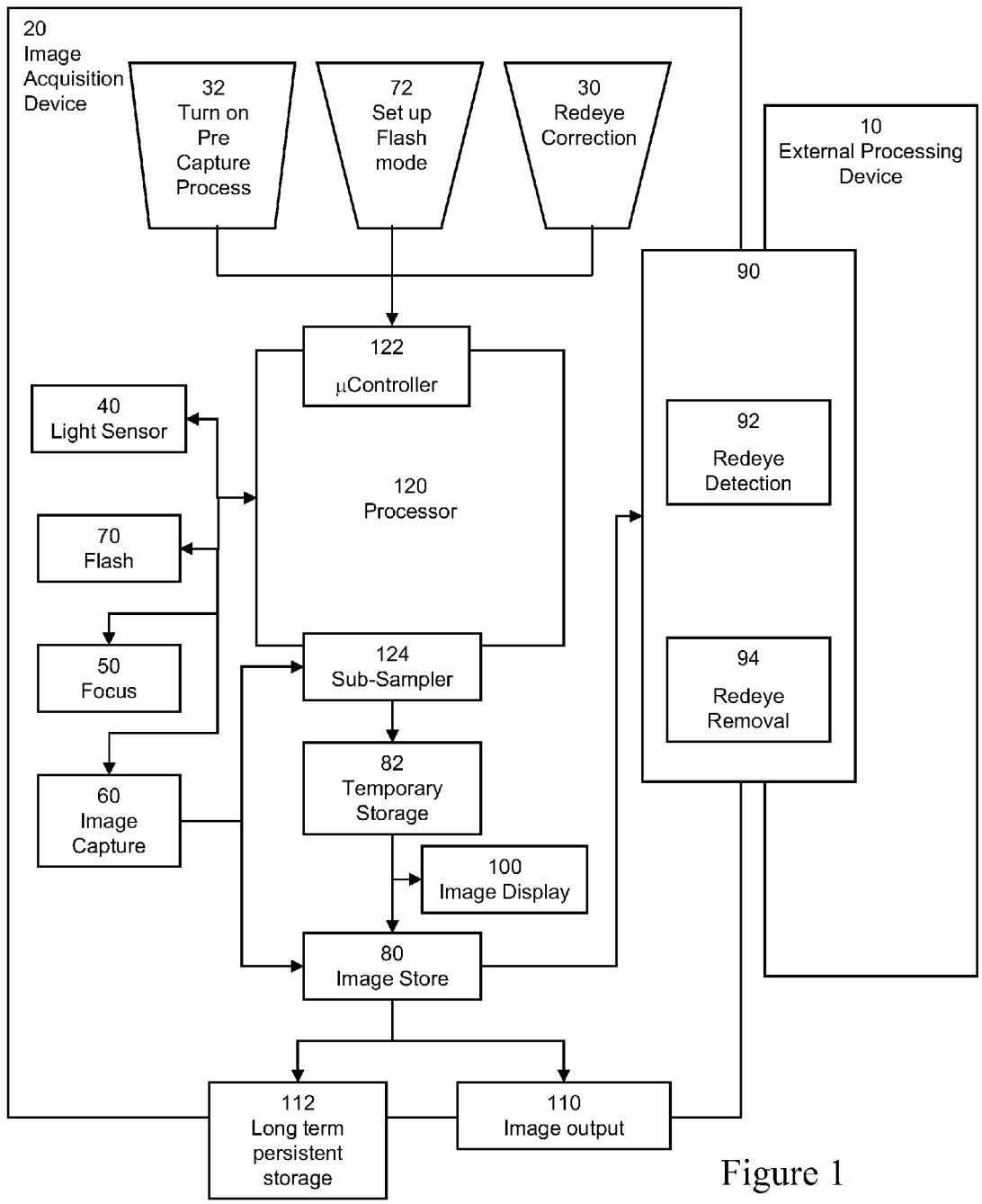
FIG. 1 is a block diagram of a digital camera operating in accordance with an embodiment of the present invention.

FIG. 1 is a block diagram of a digital image acquisition device 20 which in the present embodiment is a portable digital camera, and includes a processor 120. It can be appreciated that many of the processes implemented in the digital camera may be implemented in or controlled by software operating in a microprocessor, central processing unit, controller, digital signal processor and/or an application specific integrated circuit, collectively depicted as processor 120. Generically, all user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is monitored using light sensor 40 in order to automatically determine if a flash is to be used. A distance to the subject is determined using a focus component 50 which also focuses the image on image capture component 60. In the present specification, the term "image" refers to image data and does not necessarily imply that an actual viewable image is present at any stage of the processing.

If a flash is to be used, processor 120 causes the flash 70 to generate a photographic flash in substantial coincidence with the recording of the image by image capture component 60 upon full depression of the shutter button. The image capture component 60 digitally records the image in colour. The image capture component preferably includes a CCD (charge coupled device) or CMOS to facilitate digital recording. The flash may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory. The camera is equipped with a display 100, such as an LCD, for preview and postview of images.

In the case of preview images which are generated in the pre-capture mode 32 with the shutter button half-pressed, the display 100 can assist the user in composing the image, as well as being used to determine focusing and exposure. Temporary storage 82 is used to store one or more of the preview images and can be part of the image store 80 or a separate component. The preview image is preferably generated by the image capture component 60. For speed and memory efficiency reasons, preview images preferably have a lower pixel resolution than the main image taken when the shutter button is fully depressed, and are generated by sub-sampling a raw captured image using software 124 which can be part of the general processor 120 or dedicated hardware or combination thereof. Depending on the settings of this hardware subsystem, the pre-acquisition image processing may satisfy some predetermined test criteria prior to storing a preview image. Such test criteria may be chronological, such as to constantly replace the previous saved preview image with a new captured preview image every 0.5 seconds during the pre-capture mode 32, until the high resolution main image is captured by full depression of the shutter button. More sophisticated criteria may involve analysis of the preview image content, for example, testing the image for changes, before deciding whether the new preview image should replace a previously saved image. Other criteria may be based on image analysis such as the sharpness, or metadata analysis such as the exposure condition, whether a flash is going to happen, and/or the distance to the subject.

If test criteria are not met, the camera continues by capturing the next preview image without saving the current one. The process continues until the final high resolution main image is acquired and saved by fully depressing the shutter button.

Where multiple preview images can be saved, a new preview image will be placed on a chronological First In First Out (FIFO) stack, until the user takes the final picture. The reason for storing multiple preview images is that the last preview image, or any single preview image, may not be the best reference image for comparison with the final high resolution image in, for example, a red-eye correction process or, in the present embodiment, mid-shot mode processing. By storing multiple images, a better reference image can be achieved, and a closer alignment between the preview and the final captured image can be achieved in an alignment stage discussed later.

The camera is also able to capture and store in the temporary storage 82 one or more low resolution post-view images. Post-view images are low resolution images essentially the same as preview images, except that they occur after the main high resolution image is captured.

A redeye detection and correction filter 90 can be integral to the camera 20 or part of an external processing device 10 such as a desktop computer, a colour printer or a photo kiosk. In this embodiment, the filter 90 receives the captured high resolution digital image from the store 80 and analyzes it, 92, to detect redeyes. The analysis 92 is performed according to the principles of the invention as described in the embodiments to follow. If redeyes are found, the filter modifies the image, 94, to remove the redeye from the image using well-known techniques. The modified image may be either displayed on image display 100, saved on a persistent storage 112 which can be internal or a removable storage such as CF card, SD card or the like, or downloaded to another device via image output means 110 which can be tethered or wireless. The redeye filter 90 can be brought into operation either automatically each time the flash is used, or upon user demand via input 30. Although illustrated as a separate item, where the filter 90 is part of the camera it may be implemented by suitable software on the processor 120.

Figure 2:
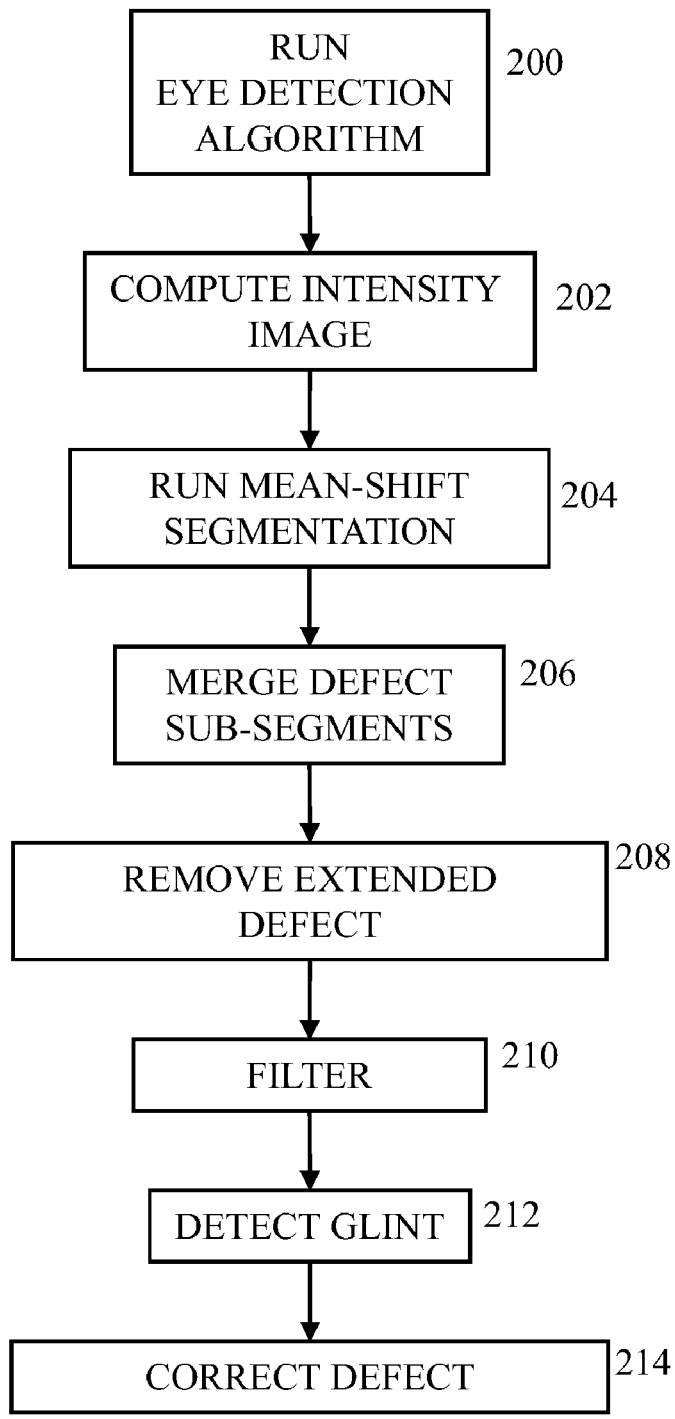
FIG. 2 is a flow diagram of the steps performed by software in the camera of FIG. 1 of an embodiment of redeye detection and correction according to the invention.

FIG. 2 is a flow diagram of the steps performed by software in the camera and/or external processing device of FIG. 1 of an embodiment of redeye detection and correction according to the invention.

1. Eye Detection

The first step 200 of the embodiment is to run an eye detection algorithm to identify regions of the image suspected to contain an eye. Examples of such algorithms are described in PCT Application No. PCT/EP2006/008342 and U.S. Application Nos. 60/865,375 filed Nov. 10, 2006; U.S. 60/865,622 filed Nov. 13, 2006; and U.S. 60/915,669 filed May 2, 2007 whose output is a detection rectangle which ideally should contain an eye but might be a false positive (a non-eye region). Moreover, even in the case where the detection rectangle contains an eye, in most cases it is a non-defect eye, which should not be modified by a subsequent correction algorithm. Therefore, the detection rectangle should be filtered to discard both non-eye and normal-eye regions before applying correction.

The main difficulty of the detection task is the wide variety of redeyes, both in terms of color (covering all possible hues from bright red to orange, yellow, white, and also combinations of them) and size. Moreover, in many cases, the defect is far from being uniform in terms of color and/or intensity. Thus, the object is to find an invariant to all of the defect eyes, i.e., a property that holds true in substantially all cases. This property is that the defect is brighter than its neighborhood, and is surrounded, in general, by a darker ring.

Thus, the detection of a defect is performed solely on the intensity image (computed in this embodiment as the average of the red and green components), whereas color information is used at the later stage to make decisions upon correcting or not a defect region.

2. Detection of a Defect

Figure 3:
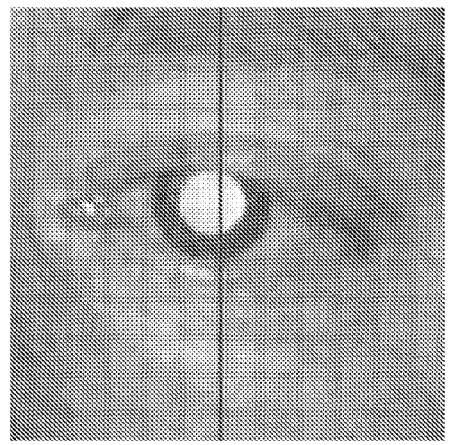
FIGS. 3 to 7 show image data processed according to the method of FIG. 2 (for clarity, FIGS. 6(a) to 6(d), 6(f) and 7 are the negative or inverted form of the relevant images described in the text).
Figure 3:
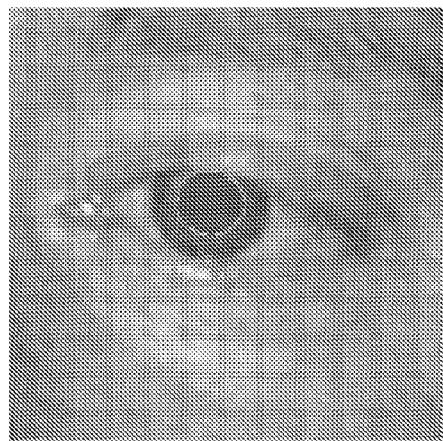
Figure 3:
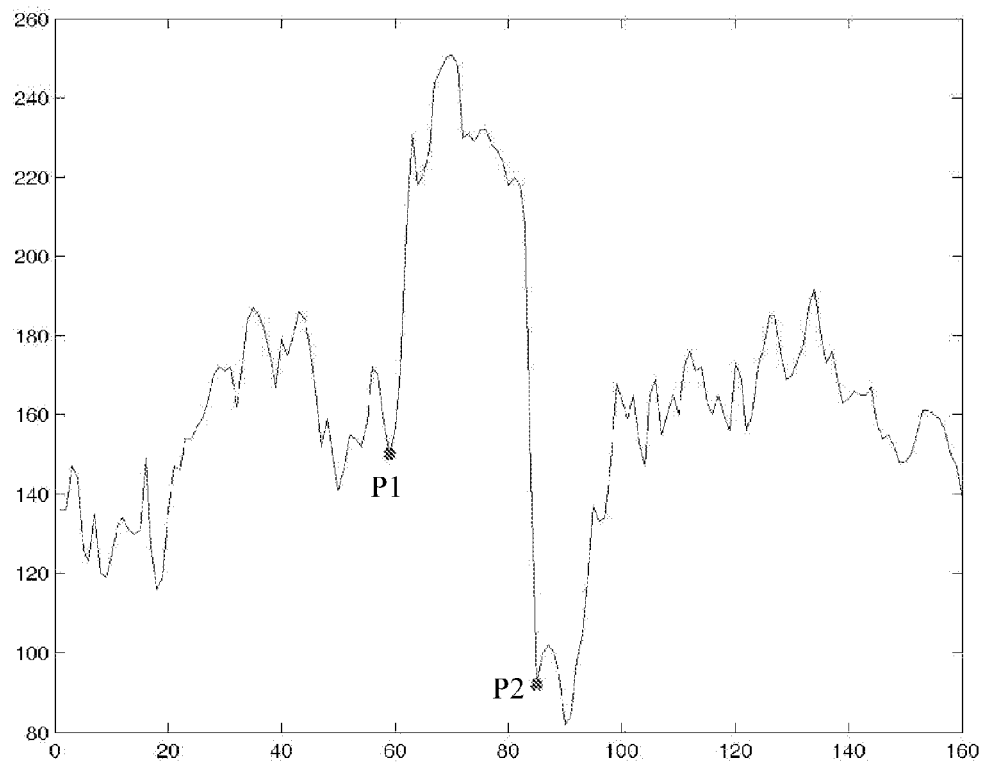

The next step 202 therefore comprises computing the intensity image, FIG. 3a, of the detection rectangle issued by the eye detection algorithm at step 200.

In order to detect the defect within the intensity image, the present method exploits the fact that it is brighter that its close neighborhood. However, attempting to separate the defect by a mere thresholding of the intensity image has little chance of succeeding. This is because, firstly, the range of luminosities of possible defects is wide, therefore no prior threshold can be set to work in all cases. Also, using adaptive thresholds, i.e. determining a threshold for each case based on local intensity information, would not work well in general. This can be explained as follows: in many cases, the border between the defect and its surrounding (iris, eyelids) is not well defined all around the defect. FIG. 3a presents an example of this situation that occurs quite often—the intensity transition between the defect and the upper eyelid is not very prominent, especially in comparison with the transition between the defect and the iris. This is seen in FIG. 3b which is an intensity profile along the vertical line seen in FIG. 3a, the two points P1, P2 marking the transition intensities between the defect and upper eyelid and iris respectively. In order to spatially separate the defect by simple thresholding, a large threshold would have to be used—larger than 160, according to P1 in FIG. 3b—which would not allow inclusion in the detected region of all pixels belonging to the defect. As one can see in FIG. 3c, which is a reduced intensity image of the defect thresholded with the lowest threshold that spatially isolates the defect, there is a bright ring that is not caught in the detected region owing to using too large a threshold.

Therefore, in order to be able to separate the defect from surrounding, a more complex technique has been devised. It is based on the observation that, in most of the cases, no matter the intensity at which the defect/surrounding transition occurs, the transition is valley-shaped.

2.1 Mean-Shift Eye Segmentation.

Figure 4:
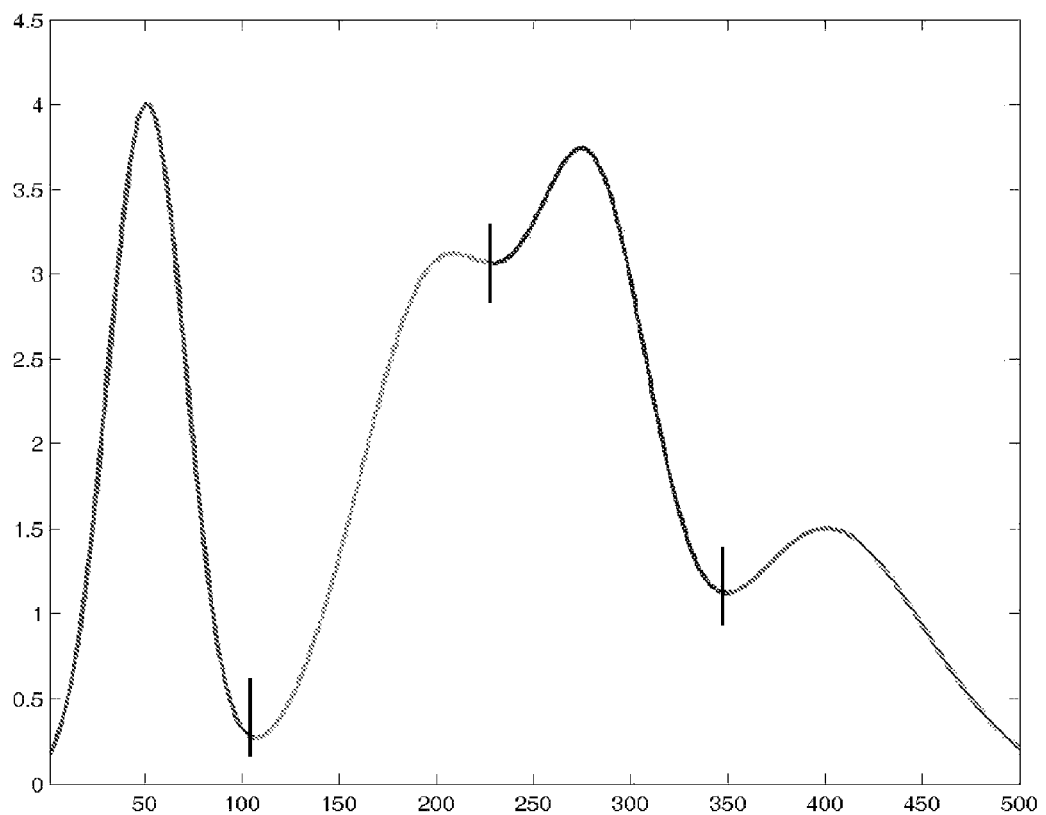

Accordingly, at step 204, the intensity image of FIG. 3a is subjected to mean-shift segmentation. The mean-shift procedure (D. Comaniciu, P. Meer: Mean Shift: A Robust Approach toward Feature Space Analysis, IEEE Trans. Pattern Analysis Machine Intell., Vol. 24, No. 5, 603-619, 2002) has been used for a number of different tasks, the most important of which is clustering (segmentation). Given an N-dimensional distribution, the basic idea of the algorithm is to identify the modes of the distribution (a mode being defined by a local maximum). As an illustration, FIG. 4 presents an example of mode identification of a 1D distribution, the short vertical lines identifying the transitions from one mode to the next. The approach is a bottom-up one, in that it starts from the points with lowest values and builds the mode evolving towards local maxima. In order to identify the modes, the following simple procedure is carried out:

For each point of the distribution, a new mode is initialized. Then, the neighbor with the maximum gradient is sought and added to the current mode.

If the maximum gradient is positive, the procedure continues in the same manner starting from the newly-added neighbor.

If the maximum gradient is negative (i.e., the current point is a local maximum) the procedure stops.

If, during the procedure, the neighbor characterized by the maximum gradient had already been inspected (that is, it has already been assigned to a mode previously), then all points belonging to the current mode are assigned to the mode of the winning neighbor.

The procedure stops when all the points of the distribution have been assigned to a mode.

This procedure is generally applied to a distribution (a probability density function, namely, a histogram). In step 204, it is applied directly on the intensity image, considering it as a surface (equivalent to a 2D distribution). If the intensity image is too large, a local averaging with a small kernel (5.times.5 at most) may be applied prior to extracting local modes, in order to reduce small variations that may cause over-segmentation (detection of too many modes).

Figure 5:
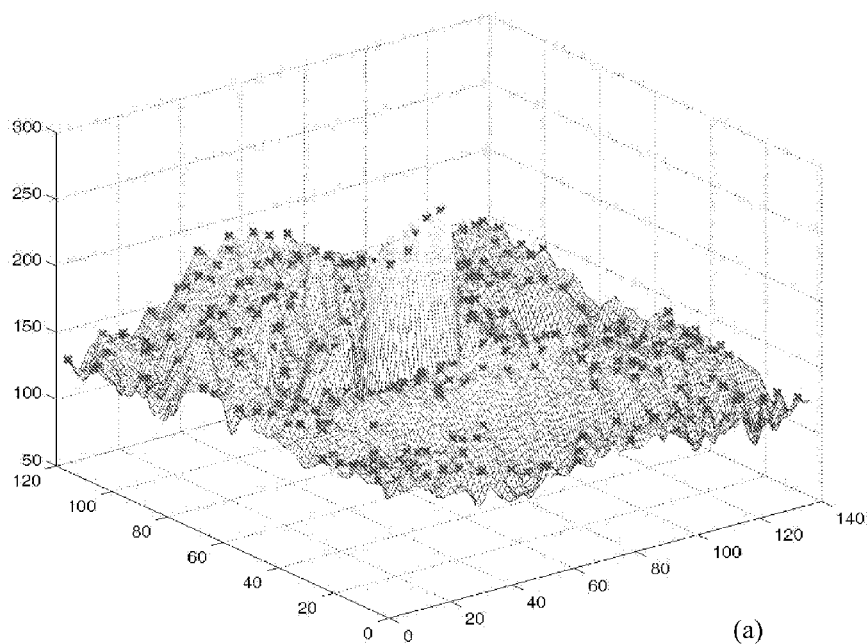
Figure 5:
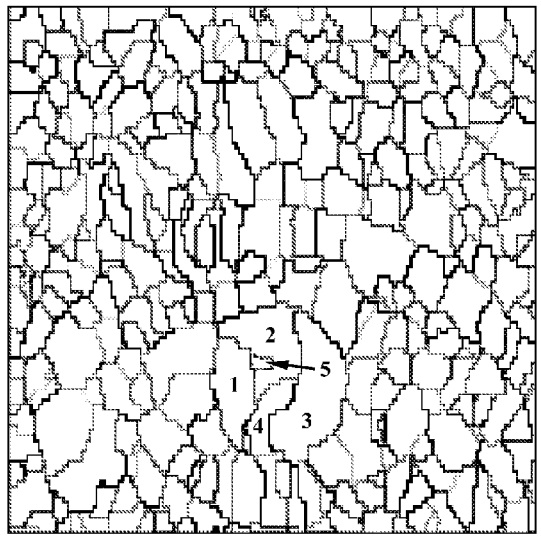
Figure 5:
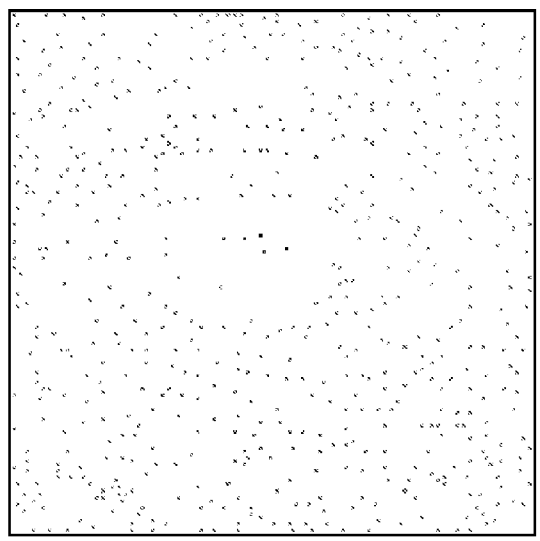

The results of mean-shift intensity segmentation are shown in FIG. 5, of which FIG. 5a is a pseudo 3D mesh of the intensity image with local maxima extracted by the mean shift segmentation, FIG. 5b shows the regions resulting from the segmentation, and FIG. 5c shows the local maxima of the regions in FIG. 5b viewed as an image. One may observe two things. First, as expected, the eye defect region is split into multiple segments, referred to as defect sub-segments, due to the fact that there are several local maxima inside the defect region—see FIG. 3b. In this case there are five defect sub-segments (labeled 1 to 5 in FIG. 5b) that belong to the eye defect. However, the defect is well separated from its surrounding—the eyelid is separated from the defect even though the border between the two is very weak at some pixels.

2.2 Merging the Defect Sub-Segments

Next, step 206, the defect sub-segments composing the eye defect are merged into a single segment.

The observation that enables merging all defect sub-segments into one segment is that, in general, the local maxima of these sub-segments are high and grouped together into a very high intensity region. Thus, this high-intensity region is extracted by thresholding with a very high threshold and, in one implementation, identifying all segments in the mean-shift segmented intensity that have their maxima located inside this region. Another criterion for identifying segments is whether portion of a segment area, for example more than 75%, lies inside the region.

Figure 6:
Figure 6:
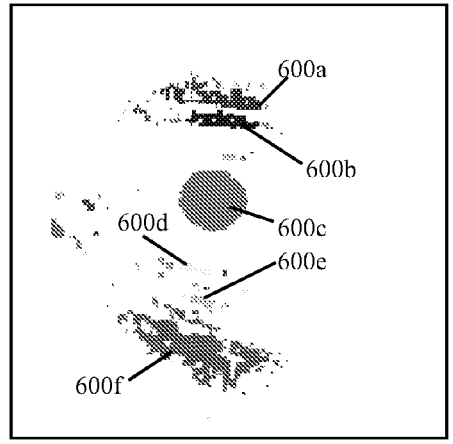
Figure 6:
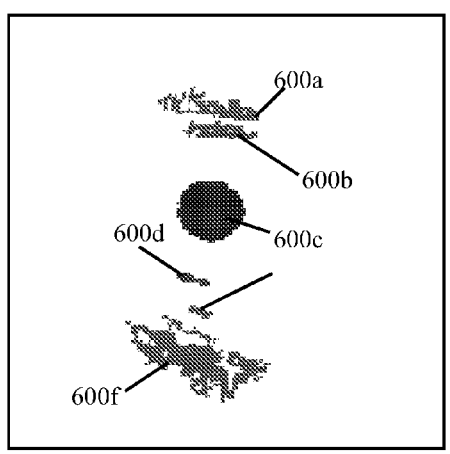
Figure 6:
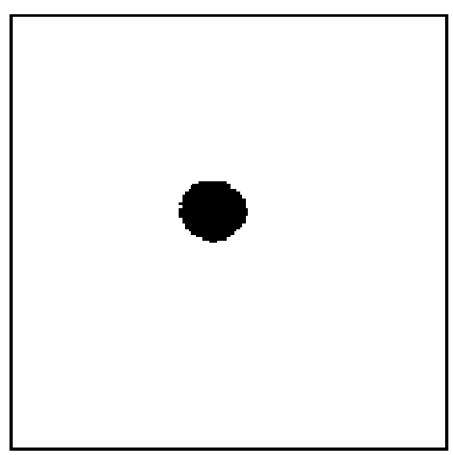
Figure 6:
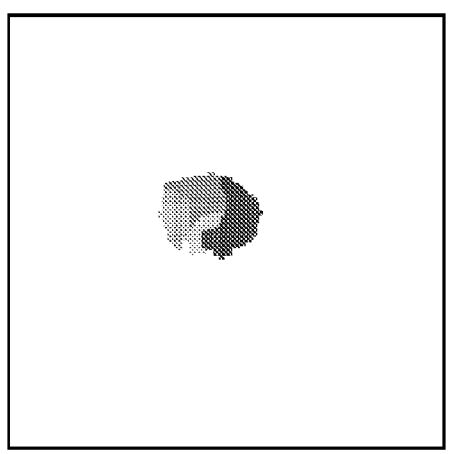
Figure 6:
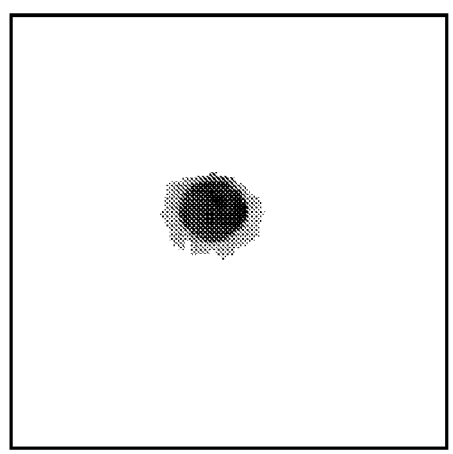

The algorithm has the following steps:

1. Automatically compute the high threshold by the following procedure:
   a. Identify the highest-intensity pixel inside the intensity image of FIG. 3a.
   b. Take a smaller rectangle centered on that pixel. The size of the rectangle depends upon the size of the eye-detection rectangle: e.g. 10.times.10 for H<100, 20.times.20 for 100<H<200, 30.times.30 for H>200, with H being the height of the eye-detection rectangle. In the example of FIG. 3(a), the size H of the eye detection rectangle is 20.times.20.
   c. Compute the average intensity of the pixels inside the smaller rectangle.
   d. Assign the threshold to the sum of the average intensity above and a fixed quantity. The fixed quantity is determined heuristically, and the value used in the present embodiment is 25.
2. Threshold the intensity image with the above-determined threshold—the result is shown in FIG. 6a.
3. Identify all connected components of the thresholded image—FIG. 6b. This comprises linking all connected pixels in the thresholded image into respective groups 600a...f (the smallest groups are not labeled).

4. Eliminate connected components (i.e. the groups not labeled in FIG. 6b) whose size is inappropriate (e.g. they are smaller than 0.1% of the eye-detection rectangle area or larger than 4% of the area) or that touch the border of the detection rectangle—FIG. 6c.

5. Rank the remaining components with respect to their average intensity and retain only the top two.

6. If the difference between the average intensities of the two components is significant (e.g., the difference between them exceeds 10% of the highest average intensity), the component with the highest average intensity is selected, otherwise the component with the highest average saturation is selected—FIG. 6d.

7. Identify all the segments in the mean-shift segmented image whose maxima are located inside the selected component (or who satisfy any other criterion relative to the selected component)—FIG. 6e.

8. Merge all segments and discard all other pixels in the intensity image—FIG. 6f.

As seen in FIG. 5f, the region determined by this procedure contains not only the bright defect, but also some parts belonging to the surroundings that should not be corrected (the whole being referred to hereinafter as the "extended" defect). Therefore, these parts are removed, step 208.

2.3 Extracting the Final Defect

Figure 7:
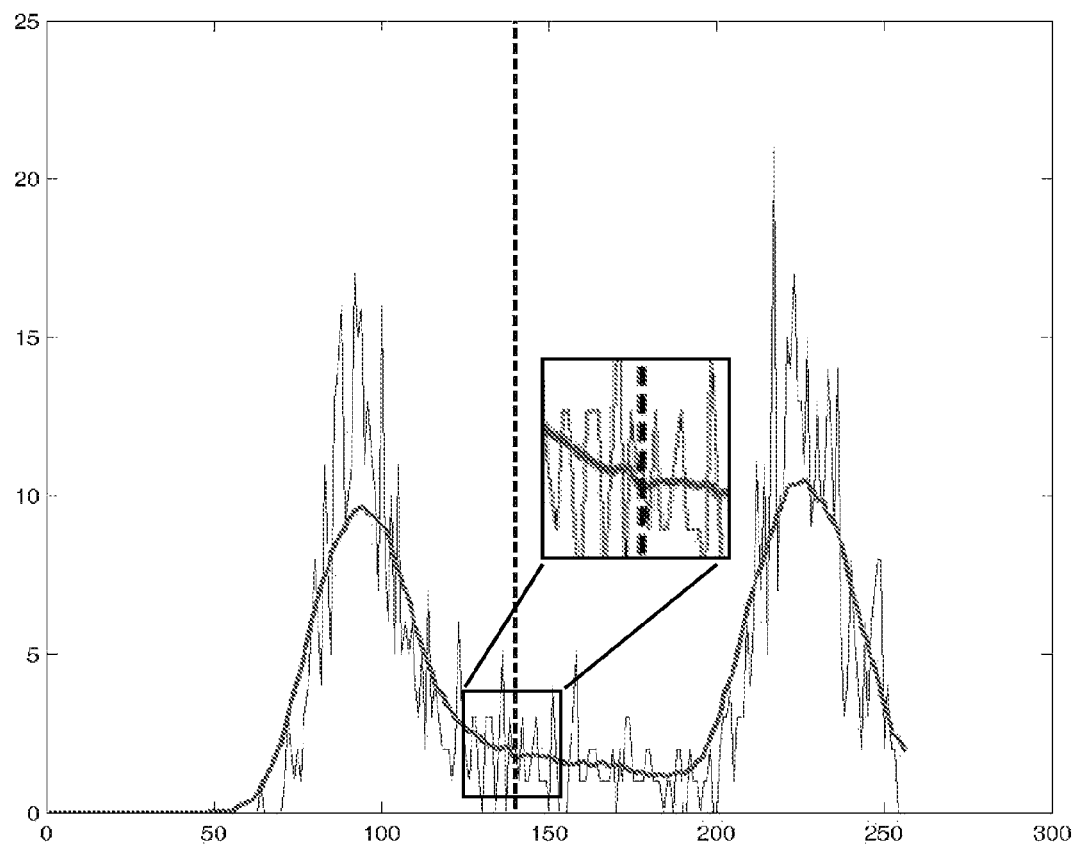
Figure 7:
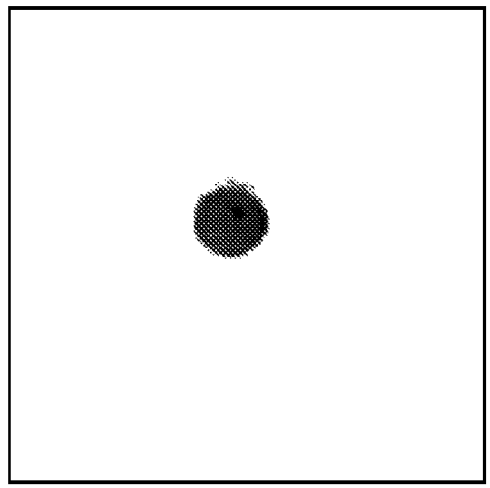

In order to segment the real defect from the extended defect, step 208 applies a histogram thresholding technique to the part of the intensity image corresponding to the extended defect. The mean-shift segmentation step 204 ensures that the extended defect contains no other bright parts than the defect, and this is central for determining the threshold on the histogram. The technique is the following: the intensity histogram of the part of the intensity image corresponding to the extended defect is computed. As the size of the extended defect is, in general, small, the histogram is very likely to be noisy (i.e. to contain many "spikes"—see FIG. 7a). Therefore, prior to computing the threshold, it is smoothed by convolving it with an n-pixel wide averaging kernel. The width n of the kernel is chosen heuristically and in the present embodiment n=31. Typically, after smoothing, the histogram is bimodal—see the smooth line in FIG. 7a. The first prominent maximum is determined, then the prominent minimum that follows is taken as the sought threshold, indicated by the vertical line in FIG. 7a. Note that the selected minimum is not the absolute minimum between the two modes, but it is a local minimum: it has (in this embodiment) 3 neighbours to the left and 3 to the right with higher values. Also, it is the first local minimum that follows the first maximum. All pixels in the extended defect having an intensity lower than the threshold are removed. FIG. 7b shows the result, obtained by thresholding the image in FIG. 6f with the threshold computed as above. What remains is potentially the real defect that must undergo correction. However, as previously stated, a decision on the likelihood that the detected region is a real defect must be made prior to applying correction.

3. Filtering

In the previous section, the procedure to identify the best candidate for the defect region inside the eye detection rectangle has been described. However, the detection rectangle might either be a false positive (i.e., a non-eye region wrongly detected by the eye detector) or contain a non-defect eye. In both cases, correction should not be applied. Therefore, the intensity image of FIG. 7b is filtered, step 210, to decide whether the defect region determined by the method described above is indeed an eye defect or not. The most likely defect candidate detected for a non-defect eye is the white part of the eye (sclera), as it is the brightest region in the detection rectangle. Correcting it would result in a very nasty false positive therefore it must not pass the filtering stage.

The principle behind the filter step 210 is that a real defect has the following properties:
  it is round;
  it is more saturated than the rest of the detection rectangle;
  it is yellowier or redder (or both) than the rest of the detection rectangle;
  its contour is darker than its inside.

Therefore, to decide whether an eye-defect candidate region is a real defect, or not, the following parameters are taken into account:
  The region's roundness (computed as the classical circularity factor, i.e. the squared perimeter to area ratio).
  The average saturation values of the region and of the detection rectangle.
  The average a values of the region and of the detection rectangle (standing for average degrees of redness).
  The average b values of the region and of the detection rectangle (standing for average degrees of redness). Both a and b are coordinates of the representation of colors in Lab color space.
  The ratio of the average intensity of the region's contour to the average intensity of the region (this measure is the only one computed on the extended defect and not on the final defect).

Based on these measures, step 210 includes a number of filter stages to assess if the general conditions appertaining to a defect are met. The filter stages take into account that few defects meet all of the four characteristics enumerated above. Therefore, each of the conditions above might be relaxed to a certain extent at the expense of the others (i.e. imposing more strict conditions on the other characteristics). For instance, an average saturation of the candidate region slightly smaller than that of the detected rectangle is acceptable provided that the region is very round, and very yellow, etc.

4. Correction

If the defect candidate region has passed all filters and has been declared a defect, it must undergo correction, which should consist in reducing the intensity of the defect. Yet, a number of additional issues should be addressed, namely, the fact that the defect might contain a glint, and also the fact that reducing the intensity of pixels inside the defect might create unpleasant artifacts at the region's border.

4.1 Glint Detection

Accordingly, a glint detection filter is applied at step 212. In general, glint is a region that is both brighter and less saturated than the rest of the defect. Hence, the glint detection filter applies the following steps:
  Detect the brightest n % points of the detected defect region.
  Detect the least saturated m % points of the detected defect region. Both m and n are chosen, as a function of the size of the defect region, based on the observation that the larger the defect area, the smaller the area occupied by the glint. Also, n>m, i.e. we allow inspection of more bright pixels than least saturated pixels because, in some defects, there are parts of the defect that are brighter than the glint (e.g. for defects having between 100 and 300 pixels, m=15, n=30, etc.).
  Intersect the two sets of points.
  Identify the connected components of the intersection.
  Choose the less saturated one as the candidate glint.

If the chosen region is round enough (roundness being assessed in terms of both aspect ratio and filling factor) it is declared glint, therefore it is removed from the region to be corrected.

4.2 Correction of the Defect

After glint detection, the region to be corrected is available. Correction then proceeds at step 214 by reducing the intensity of pixels inside the detected defect by a fixed factor, for example 5 (thus from 120 to 24, from 210 to 42, from 109 to 22, etc.). In order to reduce the artifacts at the defect border (artifacts created by the fact that pixels located on either side of the defect border are treated so much differently), after darkening the defect region, a 3.times.3 blurring is applied on the inner and outer borders of the defect. Also, another correction which is applied is redness correction in a small bounding box surrounding the defect. Its aim is to eliminate the reddish parts of the eye that do not get included in the defect region, parts that still remain visible in a number of cases unless they are processed in this manner.

The invention is not limited to the embodiment(s) described herein but can be amended or modified without departing from the scope of the present invention.

General Matters

Embodiments of the invention include apparatuses and methods for effecting red-eye defect detection. Embodiments of the invention have been described above with various specific details. It will be appreciated that such details are examples and may be modified.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for correcting a defect in a digital image containing an eye, the method comprising:
   converting the digital image into an intensity image,
   identifying a group of pixels containing an eye region within the intensity image;
   segmenting the group of pixels containing the eye region of the intensity image into segments each having a local intensity extremum,
   thresholding a corresponding portion of the digital image to identify at least two regions of relatively extreme intensity, including a pupil and one or both of an iris or an eyelid;
   selecting a region from the at least two regions identified in the thresholding step having the most extreme average intensity, and
   identifying segments from the segmenting step intersecting the region selected at selecting step according to a pre-determined criterion, and
   wherein the thresholding step uses a threshold obtained by identifying the most extreme intensity pixel inside the intensity image, computing the average intensity of the pixels inside a smaller rectangle centered on the most extreme intensity pixel, and assigning the threshold to the sum of the average intensity and a fixed quantity.

2. The method of claim 1 further comprising identifying regions from the thresholding step having a size falling within a predetermined range, and wherein said region of the most extreme average intensity is selected from said at least two regions.

3. The method of claim 1 wherein the identifying step comprises identifying those segments from the segmenting step whose extrema are located in the region selected at the selecting step.

4. The method of claim 1, comprising subjecting the intensity image to local averaging prior to mean shift segmentation.

5. The method of claim 1, wherein the converting step is performed by mean shift segmentation of the intensity image of the digital image.

6. The method of claim 1, further including:
   computing an intensity histogram of a portion of the intensity image corresponding to identified segments,
   smoothing said histogram,
   determining a threshold from the smoothed histogram, and
   thresholding the intensity histogram with the threshold from the determining step.

7. The method of claim 1 wherein the converting and segmenting are applied only to the eye region.

8. The method of claim 1 wherein the at least two regions comprise a pupil and an iris.

9. A method for correcting a defect in a digital image containing an eye, the method comprising:
   converting the digital image into an intensity image,
   identifying a group of pixels containing an eye region within the intensity image;
   segmenting the group of pixels containing the eye region of the intensity image into segments each having a local intensity extremum,
   thresholding a corresponding portion of the digital image to identify at least two regions of relatively extreme intensity, including a pupil and one or both of an iris or an eyelid;
   selecting a region from the at least two regions identified in the thresholding step having the most extreme average intensity, and
   identifying segments from the segmenting step intersecting the region selected at selecting step according to a pre-determined criterion, and
   wherein the average intensities of the at least two regions from the thresholding step having the most extreme and next most extreme average intensities differ by more than a predetermined amount, and the region selected at the selecting step comprises a region having the most extreme average intensity.

10. The method of claim 9, comprising subjecting the intensity image to local averaging prior to mean shift segmentation.

11. A method for correcting a defect in a digital image containing an eye, the method comprising:

converting the digital image into an intensity image, identifying a group of pixels containing an eye region within the intensity image;

segmenting the group of pixels containing the eye region of the intensity image into segments each having a local intensity extremum, thresholding a corresponding portion of the digital image to identify at least two regions of relatively extreme intensity, including a pupil and one or both of an iris or an eyelid;

selecting a region from the at least two regions identified in the thresholding step having the most extreme average intensity, and identifying segments from the segmenting step intersecting the region selected at selecting step according to a pre-determined criterion, and wherein the average intensities of the at least two regions from the thresholding step having the most extreme and next most extreme average intensities differ by less than a predetermined amount, and the region selected at the selecting step comprises a region having the most extreme average saturation.

12. The method of claim 11, wherein the thresholding step uses a threshold obtained by identifying the most extreme intensity pixel inside the intensity image, computing the average intensity of the pixels inside a smaller rectangle centered on the most extreme intensity pixel, and assigning the threshold to the sum of the average intensity and a fixed quantity.

13. A digital image acquisition and processing apparatus including a lens, an image sensor, a processor, and a memory having code embedded therein for programming the processor the performs the method as claimed in any of claims 1-8.

14. One or more non-transitory computer readable media having code embedded therein for programming a processor the performs the method as claimed in any of claims 1-8.

* * * * *